(12) United States Patent
Munguia et al.

(10) Patent No.: US 7,216,211 B2
(45) Date of Patent: May 8, 2007

(54) VARIABLE SIZED FLASH MEMORY IN PCI

(75) Inventors: Peter R. Munguia, Chandler, AZ (US); Kyle D. Gilsdorf, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 480 days.

(21) Appl. No.: 10/443,629

(22) Filed: May 22, 2003

(65) Prior Publication Data

US 2004/0236923 A1    Nov. 25, 2004

(51) Int. Cl.
*G06F 13/00* (2006.01)
(52) U.S. Cl. .................. 711/166; 711/103; 711/118; 711/165
(58) Field of Classification Search ............. 711/103, 711/118, 165, 166
See application file for complete search history.

(56) References Cited

U.S. PATENT DOCUMENTS

| | | | | |
|---|---|---|---|---|
| 5,657,455 A | * | 8/1997 | Gates et al. | 710/100 |
| 5,881,281 A | * | 3/1999 | Gates et al. | 713/1 |
| 6,220,510 B1 | * | 4/2001 | Everett et al. | 235/380 |
| 6,327,194 B1 | * | 12/2001 | Kurihara et al. | 365/189.09 |
| 6,775,423 B2 | * | 8/2004 | Kulkarni et al. | 382/305 |

* cited by examiner

*Primary Examiner*—Reba I. Elmore
(74) *Attorney, Agent, or Firm*—Blakely, Sokoloff, Taylor & Zafman LLP

(57) ABSTRACT

A method and apparatus for allocating a variable amount of memory to a device coupled to a bus are disclosed. In one embodiment, a first register contains a first value. A second register (e.g., Base Address Register) contains a second value that represents a default amount of memory to allocate to the device. The second value is automatically altered to indicate an updated amount of memory to allocate based on the first value. The ability to alter the default memory value substantially eliminates memory holes, which are unused portions of memory that have been allocated to devices coupled to the bus.

34 Claims, 3 Drawing Sheets

VARIABLE SIZED FLASH MEMORY IN PCI

FIELD

The embodiments disclosed herein relate to memory allocation, and more particularly to varying the amount of memory allocated to a device coupled to a bus.

BACKGROUND

Conventional computer systems generally include a central processing unit ("CPU") providing primary control of the computer system. The CPU is connected through a host bus to a Host/PCI (e.g., Peripheral Component Interconnect) bus bridge. The Host/PCI bus bridge is connected to a PCI bus, which is connected to peripheral components such as local area networks, graphics cards, and mass media devices. The Host/PCI bus bridge interfaces among the CPU, the main memory, and the peripheral components.

Different bus architectures abound in the current state of computer technology. An example of a modern bus is the PCI bus. The PCI bus is a high performance, low latency system bus, generally defined by the PCI Special Interest Group ("SIG") in PCI Local Bus Specification, Revision 2.3 (released Mar. 20, 2002). The PCI bus will be used to illustrate some of the principles behind and operation of the various embodiments disclosed herein. However, those principles may also be applied to other bus architectures.

When a device is connected to a PCI bus, an amount of memory is allocated to (e.g., reserved for) the device, if necessary. The manufacturer of the device generally sets the amount of memory to be allocated to the device, which is currently based on the number of read-only bits in a base address register ("BAR") associated with the device. In a typical system, the number of read-only bits is hardwired and cannot be altered.

In order to determine the number of read-only bits in the BAR, the BIOS (e.g., basic input/output system) or other software writes a series of all 1's to the BAR and then reads the resultant BAR. When the resultant BAR is read, the read-only bits return a value of 0 (e.g., usually a series of 0's in the lower bits of the relevant field of the BAR). The BIOS can then allocate memory to the device based on the number of read-only bits in the BAR.

In systems that employ a PCI bus, the amount of memory to be allocated to each device is set during enumeration, which is the procedure used by software (e.g., generally the BIOS or Operating System) to determine which devices are connected to the PCI bus and how much memory each device requires. Generally, the default amount of memory indicated as necessary by the BAR is equal to the largest possible amount of memory that the device can consume during operation. The default setting for some devices can be large, which is problematic if the device actually requires less than the entire allocated amount of memory.

In instances where the device does not require all of the allocated memory, a memory hole may be created such that a certain amount of memory space is unused. Naturally, unused memory reduces the efficiency and overall throughput of the system.

Besides allocating the largest possible amount of memory space to a device, another solution is to allow the device to calculate the amount of memory required by the device and configure the number of read-only bits in the BAR accordingly. However, this requires additional logic or pins and places a burden on devices that require variable amounts of memory to have information readily available regarding the quantity and size of all devices coupled to the bus before enumeration.

DESCRIPTION OF THE DRAWINGS

Various embodiments are illustrated by way of example and not by way of limitation in the figures of the accompanying drawings in which like references indicate similar elements. It should be noted that references to "an," "one," "the," "other," "various," or "alternative" embodiments in this disclosure are not necessarily to the same embodiment, and such references mean at least one.

DETAILED DESCRIPTION

In the following description, for the purposes of explanation, numerous specific details are set forth in order to provide a thorough understanding of the various embodiments. It will be apparent to one skilled in the art that the embodiments may be practiced without some of these specific details. In other instances, certain structures and devices are omitted or simplified in order to avoid obscuring the details of the various embodiments.

The following description and the accompanying drawings provide examples for the purposes of illustration. However, these examples should not be construed in a limiting sense as they are not intended to provide an exhaustive list of all possible implementations.

Various methods disclosed herein can be implemented by using a machine to read instructions stored on a machine-readable medium and to perform functions in accordance with those instructions. A machine-readable medium includes any mechanism that provides (e.g., stores and/or transmits) information in a form readable by a machine (e.g.. a computer). For example, a machine-readable medium includes read only memory (ROM); random access memory (RAM); magnetic disk storage media; optical storage media; and flash memory devices.

Figure 1:
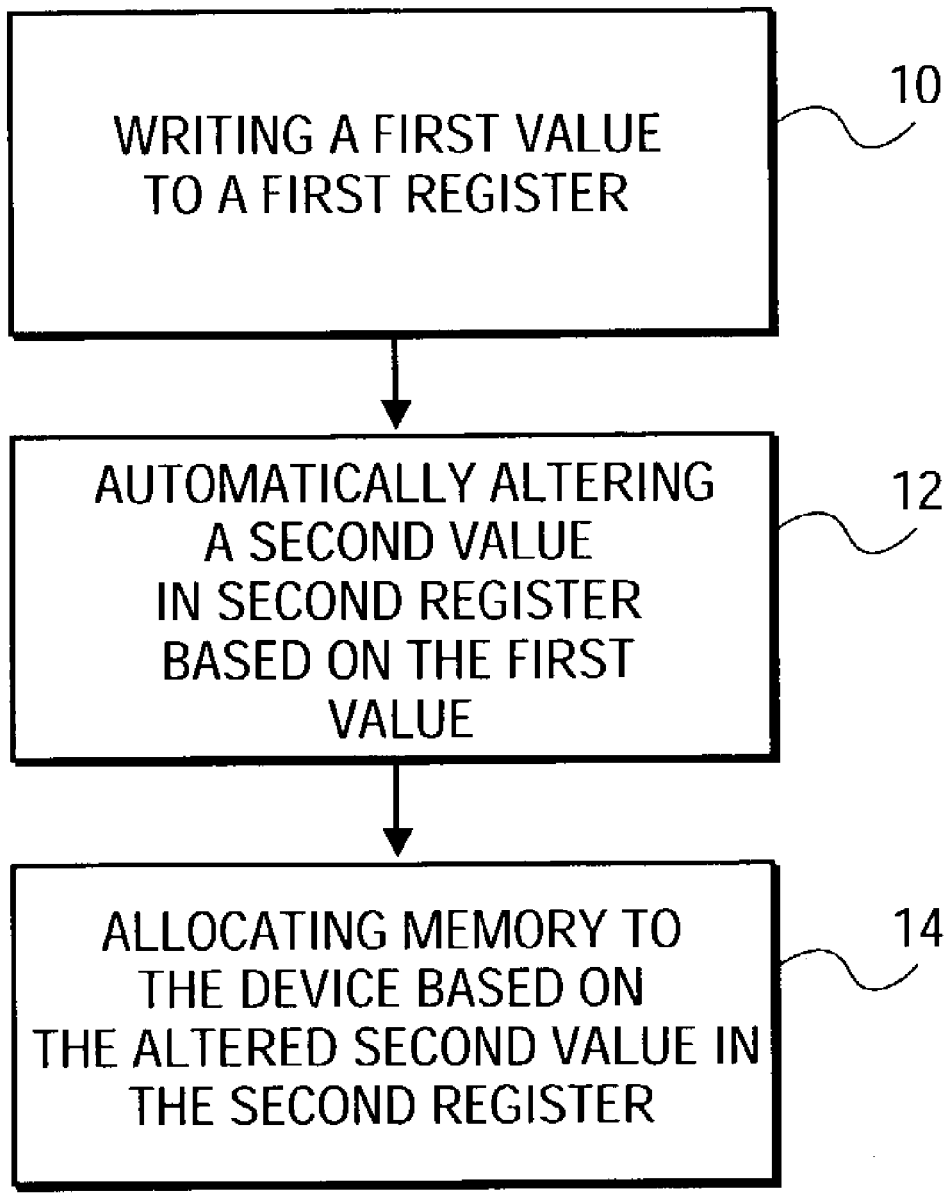
FIG. 1 is a flow chart of a method for automatically altering a default value in a register, wherein the altered value indicates an amount of memory to be allocated to a device coupled to a bus.

Referring now to FIG. 1, a flow chart for a method of allocating an amount of memory to a device coupled to a bus is shown. At block 10, a first value is written to a first register.

At block 12, a second value in a second register is automatically altered. The alteration of the second value is based on the first value. In various embodiments, the second register is a configurable base address register ("BAR"). Once configured according to the second value, the BAR contains, among other information, the actual pointer to the location in the memory map that has been assigned to the relevant device by the operating system.

In one embodiment, a user can set the size of memory to be allocated to the device by setting the first value. For example, the user can access a setup menu during the boot process of a personal computer. Within the setup menu (e.g., prior to enumeration), the user can set the first value.

The first value can be used in several different manners to alter the second value. For example, in various embodiments, the first value is a mask value that indicates which bits of a second register are to be set as read-only bits. Using the mask value of the first register, the appropriate bits of the second register are set as read-only bits. Thus, the second register (e.g., BAR) can be programmed to indicate a variable amount of memory to be allocated to a specific device(s) in a manner that is still PCI-compliant.

At block 14, memory is allocated to the device based on the altered second value in the second register. In embodiments in which the amount of memory allocated is based on the number of read-only bits in the second value, the BIOS or other software determines how much memory should be allocated to the device after the second value is altered. In an embodiment, this determination is accomplished by evaluating which bits in the altered second value are read-only bits (as described above). In various embodiments, determining includes conducting an enumeration process according to the PCI protocol.

Figure 2:
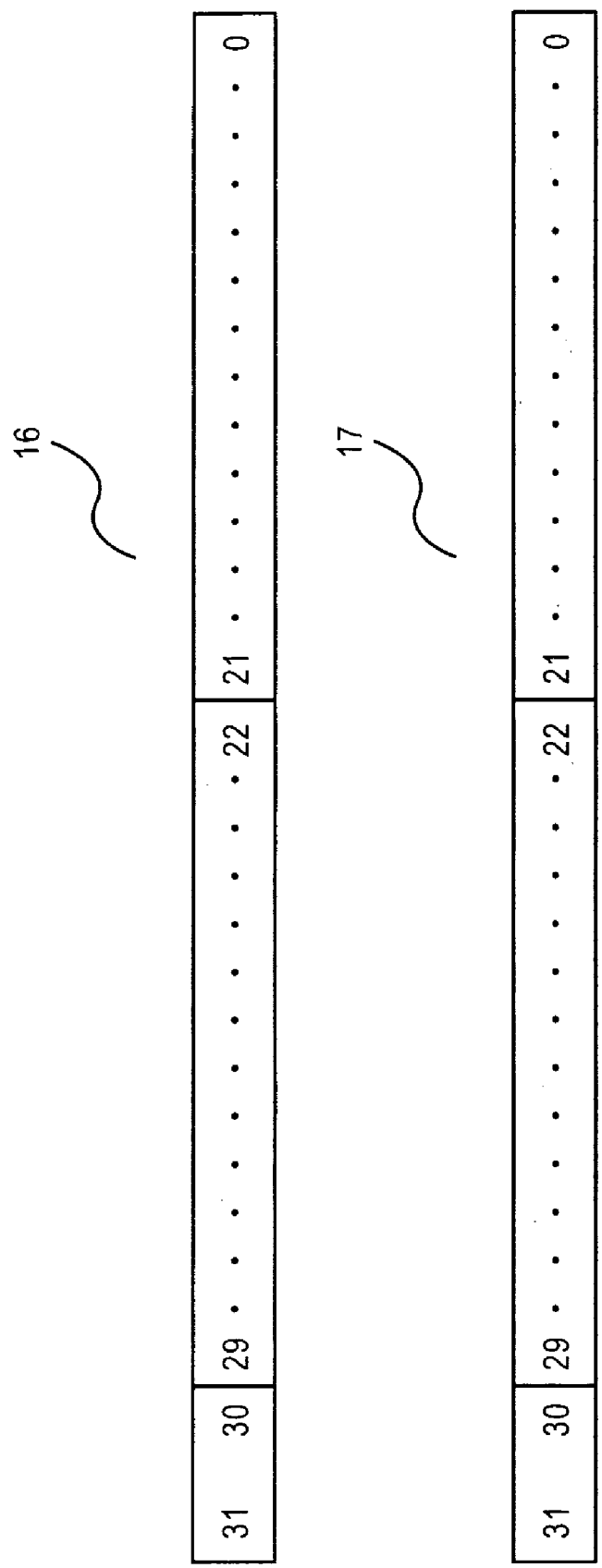
FIG. 2 is an embodiment of a first register 16 used to indicate which bits of a second register 17 should be set as read-only bits.

FIG. 2 shows an embodiment of a 32-bit mask register that is used to configure the BAR to indicate an amount of memory to be allocated to a device coupled to a bus. However, other size registers (e.g., 64-bit) are contemplated by the embodiments disclosed herein. The functionality of the various embodiments can be extended to allocate anywhere from 16 Bytes to 1 Gigabyte prior to enumeration using a 32-bit BAR. Larger regions can be reserved if a 64-bit BAR is used.

The mask register shown in FIG. 2 has several fields. For example, the field containing bits 0 through 21 and the field containing bits 30 and 31 are both reserved. Thus, bits 22 through 29 are used to signify which particular bit positions are read/writable (e.g., signified by a 1) or read-only (e.g., signified by a 0).

In various embodiments, the bits are set starting with bit 22 and progressing to the left until bit 29 is reached. Initially, a sequential series of 0's is set to indicate the number of read-only bits. After the series of 0's is completed, the remaining available bits (e.g., up to bit 29) are set with a sequential series of 1's. The 1's and 0's should not be mixed (e.g., 10011010) when writing the bits to the mask register.

Figure 4:
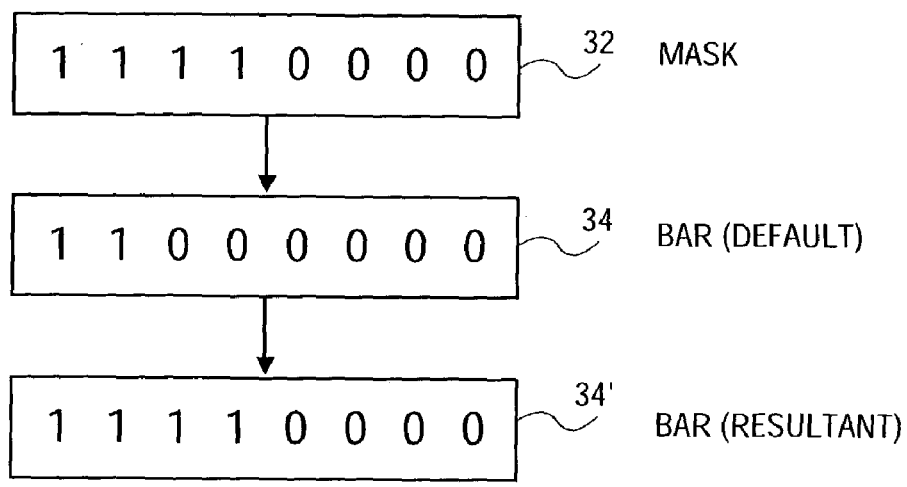
FIG. 4 shows how a mask register can be used to set specific bits within the BAR as read-only bits.

FIG. 4 shows an example of how bits 22 through 29 of FIG. 2 can be used as a mask to set the appropriate bits of the BAR as read-only. For example, mask register 32 contains four 0's in the four least significant bit positions. Default BAR 34 contains six 0's in the six least significant bit positions. Thus, if mask register 32 is not used to alter the default BAR value, a memory hole could be created since the default BAR value would allocate a larger portion of memory to the device than may be required (e.g., indicated by fewer 0's in mask register 32). In various embodiments, a logical operation (e.g., AND, OR, etc.) is carried out to obtain the final value shown in resultant BAR 34'. As described above, the amount of memory indicated in the BAR upon enumeration is then allocated to the device.

Figure 3:
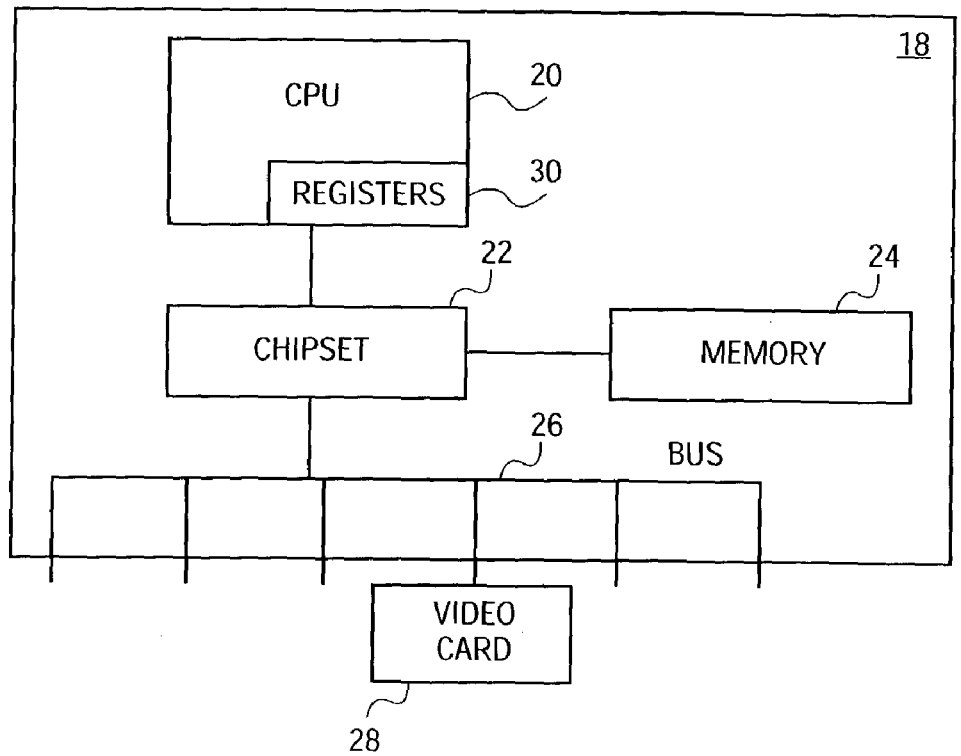
FIG. 3 is an embodiment of a system that uses a first register to automatically alter how much memory a second register should indicate is to be allocated to a device coupled to a bus.

FIG. 3 shows a system that includes the first and second registers, discussed above, in order to allocate a variable amount of memory to a device coupled to a bus. Specifically, system 18 includes processor 20 (e.g., CPU), memory 24 coupled to processor 20 via chipset 22, and bus 26 coupled to processor 20 via chipset 22. The first and second registers, among others, are represented by registers 30 located within processor 20.

In various embodiments, memory 24 is flash memory. However, other types of non-volatile memory could be used. For example, pseudo-static RAM; various types of ROM such as EPROM (erasable programmable ROM) and EEPROM (electrically erasable programmable ROM); and any PCI device could be used. Most new PCI devices act like memory devices and could use the embodiments disclosed herein to change minimum requirements.

Although not shown in FIG. 3, system 18 includes circuitry to automatically alter the second value based on the first value and/or circuitry to set at least one bit of the second value as a read-only bit, as indicated by the first value. In addition, system 18 includes circuitry (not shown) to allocate an amount of memory to a device coupled to the bus based on the altered second value.

FIG. 3 also shows video card 28 coupled to bus 26. Although not shown, other devices may also be coupled to bus 26. For example, suitable devices that may be coupled to a PCI bus include, among others, an Ethernet port, a Small Computer System Interface Host Bus Adapter (e.g., SCSI HBA), and a PCI/ISA (e.g., Industry Standard Architecture) bus bridge. In various embodiments, bus 26 may be at least one of a PCI bus, a PCI-X bus, and a PCI Express bus.

Alternatively, non-PCI bus architectures may also be used. For example, AGP (e.g., Accelerated Graphics Port) may be used in conjunction with the embodiments disclosed herein. AGP is designed specifically for the throughput demands of three-dimensional graphics and creates a dedicated point-to-point channel so that the graphics controller can have direct access to main memory.

Likewise, Plug and Play ISA may be used in conjunction with the embodiments disclosed herein. Plug and Play ISA advantageously allows the operating system to automatically configure expansion boards so that users do not need to manually configure devices connected to the bus.

Other bus architectures besides PCI, AGP, and Plug and Play ISA may be used so long as they allow the operating system to automatically set up the memory map instead of using a fixed map.

By utilizing another register to configure the BAR before enumeration, the amount of memory allocated to a device coupled to the bus can be varied, which can reduce or eliminate memory holes that are often created when a large amount of memory is allocated to a device based on a default value.

It is to be understood that even though numerous characteristics and advantages of various embodiments have been set forth in the foregoing description, together with details of structure and function of the various embodiments, this disclosure is illustrative only. Changes may be made in detail, especially matters of structure and management of parts, without departing from the scope of the various embodiments as expressed by the broad general meaning of the terms of the appended claims.

We claim:

1. A method comprising:
    writing a first value to a first register in a processor;
    automatically altering a second value in a second register in the processor based on the first value, wherein the altered second value indicates an amount of memory to allocate to a device coupled to a bus; and
    allocating memory to the device based on the altered second value in the second register.

2. The method of claim 1, wherein altering the second value comprises:
    replacing a default value in the second register.

3. The method of claim 1, further comprising:
after altering the second value, determining the amount of memory to allocate.

4. The method of claim 3, wherein determining comprises:
conducting an enumeration process according to a Peripheral Component Interconnect protocol.

5. The method of claim 3, wherein determining is based on the number of read-only bits in the second value.

6. The method of claim 1, wherein writing the first value comprises indicating which bits of the second register are to be set as read-only bits, and wherein altering the second value comprises setting at least one bit of the second value as a read-only bit, as indicated by the first value.

7. The method of claim 6, wherein altering the second value further comprises:
replacing a default value in the second register.

8. The method of claim 6, further comprising:
after altering the second value, determining the amount of memory to allocate.

9. The method of claim 8, wherein determining comprises:
conducting an enumeration process according to a Peripheral Component Interconnect protocol.

10. The method of claim 8, wherein determining is based on the number of read-only bits in the second value.

11. An apparatus comprising:
a first register in a processor to contain a first value;
a second register comprising a configurable base address register in the processor to contain a second value to indicate a first, default amount of memory to allocate to a device coupled to a bus;
circuitry to automatically alter the second value based on the first value, wherein the altered second value indicates a second, different amount of memory to allocate to the device; and
circuitry to allocate the second, different amount of memory to the device.

12. The apparatus of claim 11, wherein the bus comprises:
at least one of a Peripheral Component Interconnect bus, a Peripheral Component Interconnect-X bus, and a Peripheral Component Interconnect Express bus.

13. The apparatus of claim 11, wherein the second register is writable.

14. The apparatus of claim 11, wherein the memory comprises:
flash memory.

15. The apparatus of claim 11 further comprising:
circuitry to automatically set at least one bit of the second value as a read-only bit based on the first value to obtain the altered second value.

16. An apparatus comprising:
a first register in a processor to contain a mask value;
a second register in a processor to contain a default second value to indicate a default amount of memory to allocate to a device coupled to a bus;
circuitry to automatically set at least one bit of the default second value as a read-only bit based on the mask value to obtain an updated second value; and
circuitry to allocate an amount of memory to the device based on the updated second value.

17. The apparatus of claim 16, wherein the bus comprises:
at least one of a Peripheral Component Interconnect bus, a Peripheral Component Interconnect-X bus, and a Peripheral Component Interconnect Express bus.

18. The apparatus of claim 16, wherein the memory comprises:
flash memory.

19. The apparatus of claim 16, wherein the second register is writable.

20. The apparatus of claim 18, wherein the second register comprises:
a configurable base address register.

21. A system comprising:
a processor;
memory coupled to the processor;
a bus coupled to the processor, wherein the bus comprises at least one of a Peripheral Component Interconnect bus, a Peripheral Component Interconnect-X bus, and a Peripheral Component Interconnect Express bus;
a first register in the processor to contain a first value;
a second register in the processor comprising a configurable base address register to contain a second value to indicate a first, default amount of memory to allocate to a device coupled to the bus;
circuitry to automatically alter the second value based on the first value, wherein the altered second value indicates a second, different amount of memory to allocate to the device; and
circuitry to allocate the second, different amount of memory to the device.

22. The system of claim 21, wherein the second register is writable.

23. The system of claim 21, wherein the memory comprises: flash memory.

24. The system of claim 21 further comprising:
circuitry to automatically set at least one bit of the second value as a read-only bit based on the first value to obtain the altered second value.

25. A machine-readable medium containing instructions that, when executed by a machine, cause the machine to perform operations comprising:
writing a first value to a first register in a processor;
automatically altering a second value in a second register in a processor based on the first value, wherein the altered second value indicates an amount of memory to allocate to a device coupled to a bus; and
allocating memory to the device based on the altered second value in the second register.

26. The machine-readable medium of claim 25, wherein altering the second value comprises:
replacing a default value in the second register.

27. The machine-readable medium of claim 25, wherein the operations further comprise:
after altering the second value, determining the amount of memory to allocate based on the determined amount.

28. The machine-readable medium of claim 27, wherein determining comprises:
conducting an enumeration process according to a Peripheral Component Interconnect protocol.

29. The machine-readable medium of claim 27, wherein determining is based on the number of read-only bits in the second value.

30. The machine-readable medium of claim 25, wherein writing the first value comprises indicating which bits of the second register are to be set as read-only bits, and wherein altering the second value comprises setting at least one bit of the second value as a read-only bit, as indicated by the first value.

31. The machine-readable medium of claim 30, wherein altering the second value further comprises:
replacing a default value in the second register.

32. The machine-readable medium of claim 30, wherein the operations further comprise:
after altering the second value, determining the amount of memory to allocate.

33. The machine-readable medium of claim 32, wherein determining comprises:
conducting an enumeration process according to a Peripheral Component Interconnect protocol.

34. The machine-readable medium of claim 32, wherein determining is based on the number of read-only bits in the second value.

* * * * *